May 19, 1953 A. G. BODINE, JR Re. 23,657

METHOD OF AND APPARATUS FOR CUTTING MATERIALS

Original Filed Dec. 12, 1942

INVENTOR
ALBERT G. BODINE, JR.
BY
HARRIS, KIECH, FOSTER & HARRIS
Howard N. Foster
FOR THE FIRM
ATTORNEYS.

Reissued May 19, 1953

Re. 23,657

UNITED STATES PATENT OFFICE 23,657

METHOD OF AND APPARATUS FOR CUTTING MATERIALS

Albert G. Bodine, Jr., Van Nuys, Calif.

Original No. 2,460,919, dated February 8, 1949, Serial No. 468,803, December 12, 1942, Application for reissue September 2, 1952, Serial No. 307,578

24 Claims. (Cl. 51—59)

Matter enclosed in heavy brackets [ ] appears in the original patent but forms no part of this reissue specification; matter printed in italics indicates the additions made by reissue.

This invention relates to a method of and apparatus for cutting materials and, because it finds great utility in its application to the polishing of surfaces to provide an extremely smooth surface, embodiments of my invention adapted for such application will be described hereinafter, it being understood that the invention is not limited to such application.

This application is a continuation-in-part of my copending application Serial No. 397,252, filed June 9, 1941, for Method and Apparatus for Cutting Pipe and which issued as Patent 2,304,793 on December 15, 1942.

It is frequently desirable to provide articles with an extremely smooth highly polished surface, as for example, metal articles which are to have surfaces in moving contact with each other. Such metal articles normally have upon their surfaces small projections and indentations caused, for example, by casting or rolling or small scratches forming alternate ridges and valleys caused by the cutting action of machine tools. The removal of such projections and ridges permits the formation upon the articles of a surface highly polished and extremely smooth which diminishes the friction of such surface with a like engaging and relatively moving surface, reduces the possibility of corrosion of the surface, and minimizes the likelihood of fracture, otherwise enhanced by the valleys or indentations.

In removing the small projections and indentations to provide such a smooth highly polished surface, it is desirable that the article be not subjected to a scuffing action causing the formation of new scratches or indentations or to burnishing or peening or local surface heating causing inequalities in the resistance of the surface to deformation and fracture. It is desirable also that a method and apparatus for so polishing a surface be applicable to and capable of use upon surfaces of various forms as well as plane surfaces.

It is accordingly an object of my invention to provide a method of and apparatus for providing such a highly polished smooth surface upon articles of various forms, which do not leave any objectionable scratches in the polished surfaces and do not scuff, burnish, peen, or overheat locally the surface, thus avoiding the objections above stated.

It is desirable also that such a method and apparatus should, and it is an object of my invention to provide a method and apparatus which will, polish the surface of such articles to a high degree and an extremely smooth state and which are capable of quick and inexpensive adaptation to provide varying distances of travel and varying forces of impact over a wide range for different surfaces of the same article and which involve the minimum of moving parts and the maximum of facility of assembly and operation.

The foregoing and other objects and advantages, which will hereinafter be made apparent, are accomplished by employing sound waves as a means of actuating polishing or abrasive elements or members. The term "sound waves" as employed herein includes condensation or compression and rarefaction or tension impulses of frequencies not only within the auditory range, but also other and higher frequencies, which impulses travel with the speed of sound waves of the auditory range through an elastic medium.

The elastic medium contemplated for utilization in accordance with my invention may be a gas, a liquid, or a solid. The sound waves transmitted to the polishing elements as contemplated by my invention may represent alternate increases and decreases in pressure relative to a mean pressure which may be greater or less than normal or atmospheric pressure or pressure of the medium at rest.

Sound waves travel through an elastic medium by virtue of the movement of the particles of the medium in a direction of travel of the wave in a backward-and-forward manner similar to that of the vibrating body generating the sound waves in the medium. My invention contemplates the polishing of the surface of an article by contact therewith of abrasive particles suspended in an elastic medium by virtue of their movement induced by the drag upon such particles or molecules of such medium moving in response to sound waves propagated in the medium.

Sound waves propagated within a body of an elastic medium may be reflected either by the wall confining the medium or by its interface with any other medium of unlike density, as for example, the interface of liquid and air. When the sound wave propagated through an elastic medium reaches the interface of such medium with a denser medium, it is reflected as a like impulse, and, when it reaches the interface of such a medium with a less dense medium, it is reflected as an unlike or opposite impulse; for example, when a compression impulse traveling through air or water reaches the interface of such medium with the metal wall of a container of such medium, it is reflected as a compression impulse; whereas, when such a compression impulse traveling through a medium, such as a liquid, reaches the interface of such medium with a less dense medium, such as air, it is reflected as an unlike or tension impulse.

The frequency of the sound waves generated and the distance between the sound wave generation locus and the locus of sound wave reflection may be so related that the reflected impulse reaches the generating locus and is reflected therefrom at such time as to reinforce or amplify the newly generated impulse. The newly generated impulse reinforced by the first reflected impulse may be again reflected from the interface, this second reflected reinforced impulse again returning to the generating source to reinforce in its turn a newly generated impulse. Each such reinforcement by reflection adds to the value of the newly generated impulse, so that impulses traveling through the elastic medium reach a value considerably greater than and under suitable conditions many times the value of the generated impulse. When the factors specified have been properly related to secure this reflection and reinforcement of the generated sound wave, a condition of resonance is established within the elastic medium.

Each compression impulse transmitted through the elastic medium is followed by a rarefaction or tension impulse. When a condition of resonance is established within the medium, there is a zone of maximum pressure variation adjacent the impulse generator, and at a distance of one wave length therefrom there is a similar zone of maximum pressure variation. Halfway between these loci there is a zone also of maximum pressure variation. Under such a condition of resonance there occurs therefore at zones spaced whole numbers of half wave lengths distant from the sound wave generator maximum pressure variations. Halfway between adjacent zones of maximum pressure variations occur the zones of maximum velocity variation.

In these latter zones located at distances equal to odd multiples of quarter wave lengths, the molecules of the elastic medium are moving with the maximum velocity, alternating their direction of travel so that they travel in one direction for half of the period of the frequency of the generated impulse and in the opposite direction for the other half with an amplitude which is the summation of the generated and reflected impulses at such zones.

There is contemplated by my invention that the velocity and the amplitude of movement of the molecules of the elastic medium at these zones of maximum velocity variation in the standing or stationary sound wave established under conditions of resonance, or as near these zones as desired, shall be utilized to actuate abrasive particles or elements by their drag thereon into impact with or contact along the surface of an article to be treated.

It is desirable that a method of and apparatus for polishing the surface of an article be capable of modification or adjustment to vary readily the rate of cutting of such surface, the amplitude of movement of the cutting elements, and their pressural contact with such surface. It is a corresponding object of my invention to provide a method of and apparatus for polishing the surface of an article, which may be modified or adjusted easily by varying the relative densities of cutting elements and the medium in which they are suspended and by varying the frequency of the sound waves propagated in such medium and the relative positions of the surface to be treated and the zones of maximum velocity variation of the standing sound wave within such medium whereby the pressure and length of contact of the cutting elements with the surface may be varied.

The propagation of longitudinal sound waves through an elastic medium is permitted by the molecular cohesion of such medium, such propagation causing an elasticity stress within the medium. This same molecular cohesion of a medium permits the transmission of sound waves by a transmitter inducing the sound wave by its frictional drag thereon and causing within the medium a viscosity shear stress.

It is an object of my invention to provide a method of and apparatus for polishing the surface of an article, which utilizes a transmitter oscillated in response to sound waves transmitted thereto to propagate within an elastic medium by viscosity shear stress a wave pattern of its molecules which by their drag thereon oscillate abrasive particles in contact with such surface and to use such a transmitter both alone and in conjunction with sound waves generated within the elastic medium by elasticity stress and also inducing the movement of its molecules with their resultant drag upon and movement of the abrasive particles suspended therein.

Embodiments of the apparatus of my invention capable of accomplishing the objects and providing the advantages and performing the method hereinbefore set forth are illustrated in the accompanying drawing in which Figure 1 is a vertical elevational view partially sectioned of one embodiment of the apparatus of my invention capable of performing the method of my invention as applied to a casing in a well;

Figure 1:
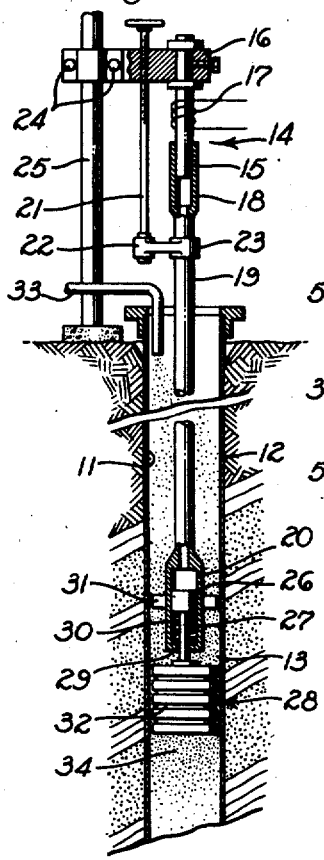

Referring to the drawing which is for illustrative purposes only, and particularly to Figure 1, the numeral 11 indicates a well, for example, an oil well, having therein a pipe, tube, or casing 12, the interior surface 13 of which it is desired to polish to an extremely smooth condition, as for example, to set a packer therein or to install therein any other device requiring such a smooth polished surface.

A sound wave generator 14 is located above the surface of the ground and includes a magneto-striction bar comprising a metallic rod or bar 15, the upper end of which is securely clamped to a horizontal supporting member 16, and a coil 17 of an electrical conductor connected to a source of alternating current of the desired frequency, not shown. The lower free end of the bar 15 is slidably disposed in fluid-tight relationship within a primary cylinder 18 communicating through a pipe 19 with a lower secondary cylinder 20. The primary cylinder 18 is adjustably secured against vertical movement relative to the fixed end of the bar 15 by an adjusting rod 21 threaded through the horizontal supporting member 16 and rotatably secured to an extension 22 projecting from a collar 23 clamped to the pipe 19 adjacent the primary cylinder 18. The horizontal supporting member 16 is adjustably clamped by bolts 24 to a vertical supporting member 25 resting upon the surface of the ground, so that the horizontal supporting member 16, sound wave generator 14, and cylinders 18 and 20 with their connecting pipe 19 may be secured at any desired elevation.

Slidably disposed in fluid-tight relationship within the secondary cylinder 20 is a piston 26 which is connected by a piston rod 27 with a wave transmitter 28. The secondary cylinder 20 is provided at its lower end with an inwardly projecting annular flange 29, and a compression spring 30 is positioned within the secondary cylinder 20 with its lower end engaging the annular flange 29 and its upper end engaging the lower surface of the piston 26. Guides 31 project from the cylinder 20 for engagement with the inner surface 13 of the casing 12 to center the transmitter 28 therein. While the transmitter 28 may be cylindrical in form without any channels or projections upon its outer surface, I prefer to form it cylindrical in cross section with a plurality of annular channels 32 therein.

The interior of the casing 12 is connected by a supply pipe 33 to a source of liquid and abrasive particles, not illustrated in the drawing.

The apparatus as described being installed in the casing 12 so that the wave transmitter 28 is at that elevation in the casing 12 at which it is desired to polish the inner surface 13, the coil 17 of the sound wave generator 14 is connected to a source of alternating current of the desired high frequency, thus causing the lower free end of the bar 15 to reciprocate rapidly within the primary cylinder 18. Such reciprocation sets up sound waves of substantially sine form which travel directly through the liquid filling the primary cyllinder 18 below the bar 15 and the pipe 19 and that part of the secondary cylinder 20 above the piston 26.

The sound waves are thus transmitted to the piston 26, tending to cause it to reciprocate in the secondary cylinder 20. The compression spring 30, during the reciprocation of the piston 26, acts as a capacitance with relation to the mass of the moving piston 26, rod 27, and transmitter 28. The resistance to deformation of the spring 30 is such that its effect as a capacitance and the effect of the moving mass as an inductance may be so related as to cause the natural period of vibration of the moving mass to be equal to the frequency of the impulses generated by the generator 15.

The frequency of the current passing through the coil 17 is varied, or the length of the liquid column between the bar 15 and the piston 26 is varied (the cross-sectional areas of the bar 15 and piston 26 being of different values) by rotation of the adjusting rod 21, so that a condition of resonance is established within the liquid column. Such a condition of resonance will be established when the length of the liquid column between the lower end of the bar 15 and the upper end of the piston 26 is a whole number of half wave lengths of sound in the liquid constituting the column.

The transmitter 28 is thus caused to reciprocate with the same frequency as the bar 15 and with an amplitude of movement which may be considerably greater than the amplitude of movement of the lower end of the bar 15.

A liquid, carry suspended abrasive particles 34 being supplied to the interior of the casing 12 through the pipe 33, occupies the space between the transmitter 28 and the inner surface 13 of the casing 12 and fills the channels 32 in the transmitter 28. The rapid oscillation of the transmitter 28, which may be of the order of 1,000 to 10,000 cycles per second, drags the liquid upwardly and downwardly between the transmitter 28 and the wall 13, exerting a viscosity shear stress upon the liquid.

The particles 34 of abrasive are in turn dragged upwardly and downwardly by the contact with them of the moving liquid surrounding them, with the result that these small abrasive particles 34 are rapidly reciprocated in contact with the surface 13 with a frequency corresponding to the frequency of the current supplied to the coil 17 and an amplitude approaching the amplitude of movement of the transmitter 28. The cutting action of each of the abrasive particles 34 may be varied by varying its mass or the viscosity of the liquid in which it is suspended or the velocity or amplitude of its movement. The velocity and amplitude of movement of the abrasive particles may be varied by varying the frequency of the current supplied to the coil 17 and the energy input to the system. The impact of the abrasive particles with the surface 13 may be very light and the amplitude of their movement extremely small while the cutting is performed with great rapidity because of the high velocity of such particles in contact with the surface 13.

The transmitter 28 can be reciprocated at different levels to polish the surface 13 of the casing 12 at different levels by securing the horizontal supporting member 16 at various positions upon the vertical supporting member 25 by the bolts 24 or by manipulation of the adjusting rod 21 until the desired length of the surface 13 has been polished.

Figure 2:
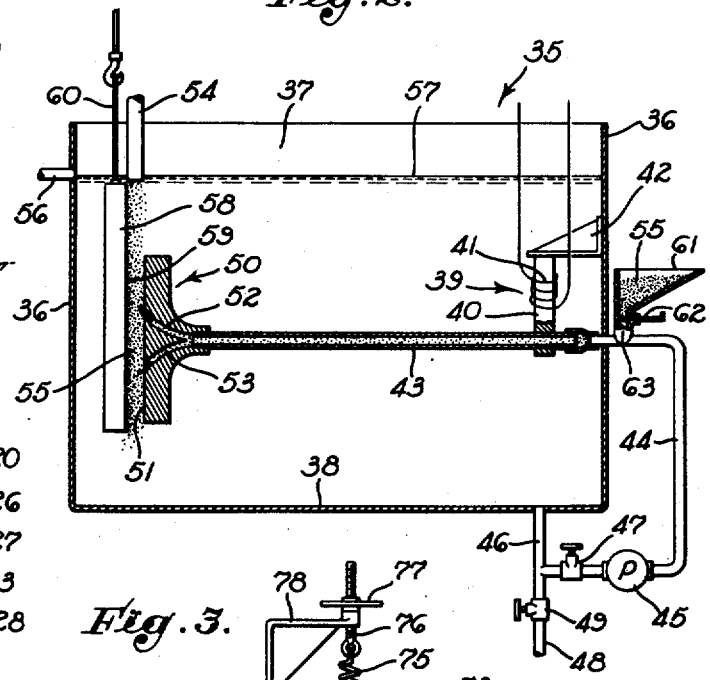
Figure 2 is a vertical sectional view partially diagrammatic of another embodiment of the apparatus of my invention, likewise capable of performing the method of my invention.

Illustrated in Figure 2 is an alternative form of apparatus of my invention in which the numeral 35 indicates a receptacle having end walls 36, side walls 37, and a bottom wall 38. As illustrated, the receptacle 35 may be open at its upper end. A sound wave generator 39 of the magnetostriction bar type, illustrated as including a metal bar 40 having wrapped therearound a coil 41 of an electrical conductor, is mounted upon a bracket 42 secured to one of the end walls 36, so that the axis of the bar 40 is vertical.

Connected to the lower end of the bar 40 is a tube 43, preferably of metal, which is rigidly connected to the end wall 36 adjacent the bar 40 by a pipe 44, which also connects it to a pump 45. The inlet of the pump 45 is connected by a pipe 46 with the bottom of the receptacle 35, this pipe being provided with a valve 47 therein. A branch pipe 48 provided with a valve 49 is connected to the pipe 46 between the valve 47 and the receptacle 35 and is connected to waste or a source of liquid supply.

Attached to the free end of the tube 43 is a transmitter 50. As illustrated, the transmitter 50 is provided with a plane surface 51 at its outer end which may be rectangular in form. Two liquid passages 52 and 53 are provided in the transmitter 50, communicating with the tube 43 and terminating at the plane surface 51. The passages 52 and 53 are curved upwardly and downwardly, respectively, so that the streams of liquid discharged therefrom at the plane surface 50 are spaced from each other and diverging.

More than two such liquid passages may be provided, if desired, to deliver diverging streams of liquid at the plane surface 51.

A supply pipe 54 is provided for delivering liquid or solid abrasive particles 55 or a mixture of liquid and such particles to the receptacle 35 adjacent the plane surface 51. An overflow pipe 56 is provided in one of the end walls 36 for maintaining the liquid in the receptacle 35 at the level indicated by the numeral 57.

An article 58, having a surface 59 to be treated or finished, is suspended within the liquid in the receptacle 35 by a cable 60 connected to any suitable vertically adjustable elevating means.

A hopper 61 containing abrasive particles 55 communicates through a valve 62 with a pipe 63 connected to the pipe 44 between the pump 45 and the tube 43.

The article 58 being suspended in the liquid as illustrated and the coil 41 being connected to a source of alternating current of the desired frequency, the tube 43 is caused to oscillate with substantially simple harmonic motion, so that its outer end and the transmitter 50 connected thereto are vibrated vertically. The frequency of the alternating current being adjusted so that the distance between the connection of the bar 40 to the tube 43 and the plane surface 51 is an odd multiple of a quarter wave length of sound in the metal of which the tube 43 and transmitter 50 are formed, a condition of resonance is established in the tube 43 and transmitter 50.

Under such a condition of resonance the transmitter 50 is caused to oscillate with an amplitude considerably greater, and, if desired, many times more, than the amplitude of movement of the lower end of the bar 40. A velocity of any desired high order may thus be secured for the transmitter 50.

By making the end face of member 50, illustrated as substantially normal to the plane surface 51, sufficiently large, the viscosity drag of member 50 will prevent oscillations so large as to fracture tube 43.

The abrasive particles 55 are suspended in the liquid between the plane surface 51 and the surface 59 of the article 58 to be finished, either by opening the gate valve 62 so that liquid passing through the pipe 44 and passages 52 and 53 carries the abrasive particles to this desired locus, or by discharging the abrasive particles 55 alone or suspended in a liquid through the pipe 54 adjacent the plane surface 51.

The valve 47 being open, the pump 45 is actuated to draw liquid and abrasive particles 55 from the bottom of the receptacle 35 and to discharge such liquid and abrasive particles through the liquid passages 52 and 53 in diverging streams contacting the surface 59. The abrasive particles 55 carried by such diverging streams exert a cutting or polishing action upon the surface 59.

The molecules of liquid in contact with the plane surface 51 of the transmitter 50 are dragged by the plane surface 51 upwardly and downwardly as the transmitter 50 is correspondingly actuated. The movement of such molecules of the liquid adjacent the plane surface 51 is communicated to the molecules of the liquid more distant therefrom, with the result that the molecules of liquid adjacent the surface 59 are likewise caused to reciprocate vertically. The reciprocation of the liquid adjacent the surface 59 by the drag effect of the liquid upon the abrasive particles 55 causes these abrasive particles to reciprocate in contact with the surface 59. The reciprocation of the abrasive particles 55 in contact with the surface 59 is of the same frequency as that of the alternating current supplied to the coil 41. An extremely rapid cutting action may be accomplished with very light pressural contact of the particles 55 with the surface 59 and with very small amplitude of their movement by virtue of their great velocity. *As will be entirely obvious to those skilled in the art, the first cut may subsequently be deepened by decreasing the distance between the tool surface 51 and the work piece as the abrasive particles progressively remove material from the work, and this may easiest be accomplished with the embodiment of Figure 2 by advancing the work piece toward the tool.*

The direction of motion of the abrasive particles 55 adjacent the surface 59 is a resultant of the effect of the drag thereon of the liquid surrounding them and reciprocating in response to the oscillation of the transmitter 50, and the effect of the velocity of the diverging liquid streams from the liquid passages 52 and 53, and the effect of the stream supplied through the pipe 54 and the effect of gravity upon the particles.

The valve 49 may be opened to withdraw from the pipe 48 and the system any portion desired of the contents of the receptacle 35. While the sound wave generator 39 is energized and the transmitter 50 is oscillated in response thereto, the pump 45 need not be utilized, for liquid may be withdrawn from the bottom of the receptacle 35 and caused to flow through the pipe 44 and tube 43 by the discharge of the liquid through the liquid passages 52 and 53 caused by the oscillation of the transmitter 50.

Figure 3:
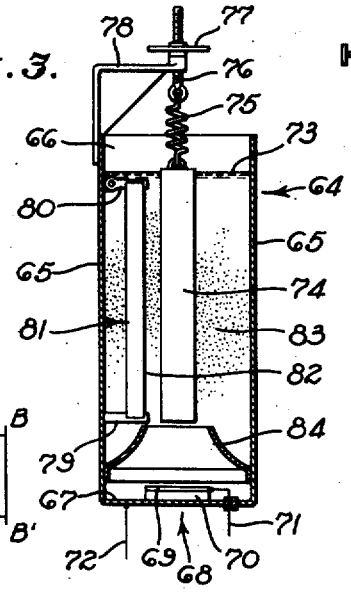
Figure 3 is a vertical sectional view partially diagrammatic of another embodiment of the apparatus of my invention also capable of performing the method of my invention.

In the alternative form of apparatus of my invention illustrated in Figure 3, the numeral 64 indicates a receptacle having side walls 65, end walls 66, and a bottom wall 67. A sound wave generator 68 is provided on the bottom wall 67. As illustrated, the sound wave generator 68 includes a piezo-crystal 69 mounted upon a conductor member 70 secured to the bottom wall 67 of the receptacle 64. The piezo-crystal 69 and the conductor member 70 through the bottom wall 67 are connected by conductors 71 and 72, respectively, to a source of alternating current of the desired frequency.

The receptacle 64 is filled with a suitable liquid to the level indicated by the numeral 73, and a wave transmitter 74 is suspended in the liquid by a tension spring 75 from a suspension member 76 adjustably secured by a hand-wheel 77 threaded thereon to a bracket 78 attached to one of the side walls 65. Supported in any suitable manner within the receptacle 64, as between a lower bracket 79 attached to one of the side walls 65 and an upper bracket 80 hingedly connected to the same side wall 65, is an article 81 having a surface 82 to be treated or polished.

In the operation of this embodiment of the apparatus of my invention polishing members in the form of small abrasive particles 83 are continuously supplied to the liquid, or the liquid containing them is continuously agitated, so that they are suspended between the transmitter 74 and the surface 82 to be treated. The sound wave generator 68 is then energized by an alternating current of the desired frequency, so that a sound wave of substantially sine form is transmitted through the liquid to the transmitter 74.

The frequency of the current supplied to the piezo-crystal 69 is so related to its distance from the transmitter 74 that this distance is an odd multiple of a quarter wave length of sound in the liquid, thus establishing a condition of resonance.

The spring 75 is made of such strength relative to the mass of the transmitter 74 that it acts as a pure capacitance, the natural period of vibration of the transmitter 74 as a whole being the same as the generator.

In response to the sound wave transmitted to it through the liquid, the transmitter 74 is caused to oscillate vertically in the manner hereinbefore described in connection with other forms of apparatus of my invention. This oscillation of the transmitter 74, as has also been previously described, causes the rapid reciprocation of the abrasive polishing particles 83 suspended in the liquid in contact with the surface 82 to be polished.

A reflector 84 is positioned in the lower portion of the receptacle 64 so that sound waves from the generator 68 are directed against the lower end of the transmitter 74 and between the surface 82 of the article 81 to be polished and the adjacent surface of the transmitter 74 while preventing the transmission of sound waves to the lower end of the article 81. The reflector serves to concentrate the sound waves from the generator 68 against the transmitter 74 and between the transmitter 74 and the article 81, while preventing the direction of sound waves against the lower end of the article 81 and the edge of its surface 82 and the abrasion thereof which would result.

The level 73 of the liquid within the receptacle 64 may be adjusted so that the length of the liquid column between the level 73 and the piezo-crystal 69 is such that resonance is established within this liquid column. Since the pressure and rarefaction impulses are reflected from the surface of the liquid and into the liquid as unlike or opposite impulses, this liquid column will be of a length equal to an odd multiple of quarter wave lengths of sound in the liquid when such resonance is established.

The motion of the abrasive particles 83 suspended in the liquid adjacent the surface 82 is therefore the resultant of the effect of the liquid surrounding them moving in response to the reciprocation of the transmitter 74 and in response to the sound waves transmitted directly from the generator 68. The frequency of the impulses transmitted to the liquid and abrasive particles 83 adjacent the surface 82 by the transmitter 74 is the same as the frequency of the impulses transmitted to the liquid and such particles directly from the generator 68.

If the transmitter 74 be located at the proper distance from the surface 82, the lag in the movement of the molecules of liquid adjacent the surface 82 with respect to the movement of the transmitter 74 may be made such that the movement of the molecules of liquid adjacent the surface 82 induced by the standing sound wave transmitted through the liquid at alternate maximum velocity variation zones will be reinforced and amplified by the effect of the reciprocation of the transmitter 74, while at the other alternate maximum velocity variation zones such movement of such molecules of the liquid will be reduced by the effect of such reciprocation of the transmitter 74. This difference in the combined effects of the transmitter 74 and generator 68 upon the particles 83 at adjacent maximum velocity variation zones is due to the fact that the particles are urged in opposite directions at such adjacent zones by the sound waves transmitted directly from the generator 68 and in the same direction by the wave pattern transmitted from the transmitter 74.

The movement of the liquid and abrasive particles 83 induced by subjecting the liquid to elasticity stress imposed by the stationary sound wave transmitted directly from the piezo-crystal 69 may thus be reinforced by the effect of the reciprocation of the transmitter 74 subjecting the liquid to viscosity shear stress, with the result that the amplitude of movement of the abrasive particles induced by the standing sound wave, and already increased over the amplitude of movement of the piezo-crystal 69 by the condition of resonance, is still further increased by the effect of the transmitter 74.

The amplitude of movement of the surface finishing elements and particles caused by the transmitters 28 and 50 may be enhanced by sound waves transmitted thereto under conditions of resonance through the fluid in which they are suspended by auxiliary sound wave generators in addition to the sound wave generators 14 and 39, respectively.

With respect to all forms of the apparatus of my invention hereinbefore described, there may be employed fluid of any desired characteristics, preferably water or oil of suitable viscosity. For the abrasive particles there may be employed full size grains of silicon carbide or aluminum oxide, each of which has several sharp points or edges upon its boundary contour and definite cleavage planes, so that it is individually friable, or sand, or particles of metal, or particles of any material harder than the surface being treated and with sharp edges thereon. The sound waves may be generated not only by generators of the piezo-crystal and magneto-striction bar types, as illustrated and described, but by any other suitable types of generators, such as a diaphragm or piston, oscillated by an eccentric shaft driven by an electric motor.

All forms of the apparatus of my invention contemplate that the method of my invention may be performed therewith to subject the surface being polished to uniform action of the polishing elements throughout the desired area by moving the surface being treated or the sound wave generator to vary the locus of the surface subjected to the maximum velocities of the contacting elements.

Figure 4:
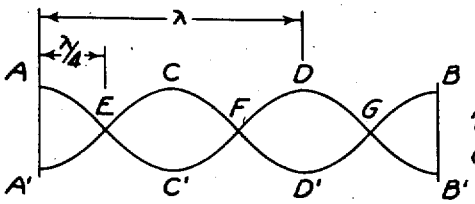
Figure 4 is a diagrammatic view of a stationary or standing sound wave in the sound transmitting medium.

Likewise, all of the forms of apparatus of my invention herein described may be operated in accordance with the method of my invention to set up a standing sound wave, such as illustrated in Figure 4, which assumes, for illustrative purposes only, that the distance between the sound wave generator and a reflecting wall of greater density than the transmitting medium is equal to one and a half wave lengths of sound in the transmitting medium.

In Figure 4 the abscissa represents the distance between the generator and the reflecting wall and the mean pressure at the level of the transmitted sound wave, and the ordinates represent variations in pressure above and below such mean value.

It will be seen from Figure 4 that there is a zone of maximum pressure variation at points AA′ and BB′, representing the reflecting wall and the sound wave generator, respectively, and also at points CC′ and DD′ spaced therefrom and from each other a distance of half a wave length. Separated a quarter wave length from each of these maximum pressure variation zones are zones of minimum pressure variation or maximum velocity variation, identified as E, F, and G.

It is apparent from Figure 4 that the surface finishing elements at the maximum velocity zones E, F, and G, that is to say, the distances equal to odd multiples of quarter wave length will have the maximum velocity and amplitude of movement. Therefore the portions of the surface of the article contacting the surface finishing elements at the maximum velocity variation zones are subjected to impact of the particles of the greatest value and during their maximum movement.

Figure 5:
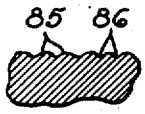
Figure 5 is a fragmentary enlarged sectional view of the ridges and valleys formed in the surface of an article by machine tool scratches.

The surface finishing elements are of dimensions greater than the distance between adjacent ridges 85 of machine tool scratches or adjacent projections of the roughened surface to be polished, so that their action is expended upon the ridges 85 or projections until they are flattened to the level of valleys 86 or the indentations adjacent, these ridges and valleys of the machine tool scratches being illustrated in Figure 5.

Those embodiments of the apparatus of my invention and the method of my invention may be employed also for removing rust, paint, scale, or other foreign matter from the surface of articles, or for roughening the surface by employing suitable amplitudes of movement for the particles and suitable dimensions and characteristics of the particles with a proper energy input to the system.

Any desired frequency of sound waves may be employed in each apparatus, and in the performance of the method of my invention I have found that frequencies varying between 1000 and 50,000 per second are suitable for polishing the surface of an article.

It will be seen that, by varying the frequency of the sound waves generated, the location of the surface being treated with respect to the zones of maximum velocity variation, the mass of the individual surface finishing elements, and the energy input to the system, the method and apparatus of my invention may be very readily modified to provide any amplitude of movement and force of impact desired and that, by varying the concentration of the surface treating elements suspended in the fluid, as well as these factors, the method and apparatus of my invention may be readily modified to vary the rate of the cutting action to the desired value.

It will also be seen that, due to the very great velocity of the surface finishing elements, the surface may be cut or polished at an extremely high rate, while at the same time maintaining a force of impact of the individual surface finishing elements against, and an amplitude of their movement in contact with, the surface being treated of an extremely low order, with the result that there is no objectionable scratching, burnishing, peening, or local surface heating during the polishing of the surface.

Any extremely shallow scratches which are formed by the contact of the surface finishing elements with the surface being treated are a result of their movement induced by a number of factors, including their deflection by contact with other surface finishing elements and molecules of the fluid contacting the surface, and therefore any such minute scratches are not objectionable, since they are extremely short and of no definite pattern. Contributing to the avoidance of the objectionable scratches and burnishing and local surface heating is the circulation of the fluid in which the surface treating elements are suspended in contact with the surface during treatment, which operates both to cool the surface during this treatment and to carry away particles of metal cut therefrom.

The suspension in a fluid of abrasive particles individually friable to present any sharp edges in the manner contemplated by my invention provides a cutting action superior to any capable of accomplishment employing a solid honing member in which such particles are embedded, since, when the particles are suspended in a fluid, they are free to rotate in all directions to present sharp edges [of] *to* the surface being treated when other edges of the particles are dulled or smoothed.

While I have described the apparatus of my invention as being employed to treat the surface of only one article at a time and have described the method of my invention as being applied to single articles, it will be apparent that a plurality of articles may be simultaneously treated by immersion in the fluid carrying the suspended surface finishing elements. Likewise, while I have illustrated in Figure 1 the treatment of the interior surface of an article, my invention contemplates the treatment of the exterior surface as well as the interior surface of such an article. Also, although I have illustrated and described uses of the apparatus and practices of the method of my invention as involving the movement of the surface finishing elements relative to the surface to be treated, my invention also contemplates the oscillation of the article to be treated relative to the surface finishing elements in response to sound waves. There is not excluded from my invention the screening or protecting of desired portions of the surface from the action of the sound waves and the surface treating elements or the concentration of the sound waves and surface finishing elements against desired areas of the surface to be treated, by the use of screens, baffle members, reflectors, or deflectors of any desired shape as well as the shape of the reflector 84 as it is illustrated in the drawing.

If desired to vary the pattern of the paths of contact of the surface finishing elements with the surface being treated, the surface may be disposed at any desired angle with the surface of the wave transmitter or the direction of propagation of the sound waves adjacent thereto. Such an angular relationship facilitates the uniform polishing of surfaces of irregular form, and the treating of such irregular surfaces as well as plane surfaces may be facilitated by providing the face of the wave transmitter adjacent the surface being treated with corrugations, channels, or any desired pattern of irregularities. The transmitters 28, 50 and 74 may be spaced as close as desired to the surfaces 13, 59, and 82, respectively, to be treated so long as there is between them fluid containing surface finishing elements suspended therein. This spacing is preferably of the order of a fraction of an inch.

While the embodiments of the apparatus of my invention hereinbefore illustrated and described are fully capable of accomplishing the objects, and providing the advantages, and performing the method of my invention primarily stated, there are various other embodiments capable of accomplishing these objects and providing these advantages, and performing the method of my invention, and I therefore wish my invention to be understood as not restricted to the specific embodiments of the apparatus or the specific method hereinbefore described, but as including all of the modifications thereof which come within the scope of the claims which follow.

I claim as my invention:

1. The method of treating the surface of an article, which involves the use of a wave generator and a transmitter with connecting means between them, and which includes the steps of: positioning the transmitter adjacent the surface to be treated; positioning a body of fluid in contact with such surface and the transmitter; suspending cutting elements in the fluid; positioning the generator more remote from such surface than the transmitter; vibrating the transmitter by the transmission from the generator to the transmitter of waves of condensation and rarefaction in the connecting means characterized by their travel at the speed of sound; and rapidly oscillating the cutting elements while in contact with such surface by the drag of molecules of the fluid moving in a wave pattern propagated by variations in the viscosity shear stress in the fluid induced by the vibrations of the transmitter.

2. The method of treating the surface of an article, which method involves the use of a wave transmitter and a wave generator, and which includes the steps of: positioning the transmitter adjacent the surface to be treated; positioning a body of fluid in contact with such surface and the transmitter; suspending cutting elements in said fluid between such surface and the transmitter; positioning the wave generator spaced from the transmitter and such surface; oscillating the transmitter by waves from said generator characterized by their travel from said generator to said transmitter at the speed of sound; and rapidly oscillating such elements while in contact with such surface by the oscillations of the transmitter transmitted to such suspended elements by the fluid.

3. The method of treating the surface of an article, which method involves the use of a wave transmitter and a wave generator, and which includes the steps of: positioning the transmitter adjacent the surface to be treated; positioning a body of fluid in contact with such surface and the transmitter; suspending cutting elements in said fluid between such surface and the transmitter; positioning the wave generator spaced from the transmitter and such surface; oscillating the transmitter by waves from said generator transmitted to the transmitter under conditions of resonance; and rapidly oscillating such elements while in contact with such surface by the oscillations of the transmitter transmitted to such suspended elements by the fluid.

4. The method of treating the surface of an article, which method involves the use of a wave transmitter and a wave generator, and which includes the steps of: positioning the transmitter adjacent the surface to be treated; positioning a body of fluid in contact with such surface and the transmitter; suspending cutting elements in said fluid between such surface and the transmitter; positioning the wave generator spaced from the transmitter and such surface; oscillating the transmitter by waves from said generator transmitted through such fluid and characterized by their travel through such fluid at the speed of sound; and rapidly oscillating such elements while in contact with such surface by the oscillations of the transmitter transmitted to such elements through said fluid in which they are suspended.

5. The method of treating the surface of an article, which method involves the use of a wave transmitter and a wave generator with connecting means between them, and which includes the steps of: positioning the transmitter adjacent the surface to be treated; positioning a body of fluid in contact with such surface and the transmitter; suspending cutting elements in said fluid between such surface and the transmitter; positioning the wave generator spaced from the transmitter and such surface; oscillating the transmitter by waves from said generator transmitted thereto by movement of particles of the connecting means transversely of the direction of such transmission and characterized by their travel at the speed of sound; and rapidly oscillating such elements while in contact with such surface by the oscillations of the transmitter transmitted to such elements through said fluid in which they are suspended.

6. The method of treating the surface of an article, which method involves the use of a wave transmitter and a wave generator with connecting means between them, and which includes the steps of: positioning the transmitter adjacent the surface to be treated; positioning a body of fluid in contact with such surface and the transmitter; suspending cutting elements in said fluid between such surface and the transmitter; positioning the wave generator spaced from the transmitter and such surface; oscillating the transmitter by waves from said generator transmitted thereto by movement of particles of the connecting means parallel to the direction of such transmission and characterized by their travel at the speed of sound; and rapidly oscillating such elements while in contact with such surface by the oscillations of the transmitter transmitted to such elements through said fluid in which they are suspended.

7. The method of treating the surface of an article, which method involves the use of a wave generator and a transmitter, and which includes the steps of: positioning the transmitter adjacent the surface to be treated; moving a stream of fluid between and in contact with such surface and the transmitter; suspending cutting elements in the stream; positioning the generator spaced from the transmitter and such surface; rapidly oscillating the transmitter by waves from the generator characterized by their travel between said generator and said transmitter at the speed of sound; and rapidly oscillating the cutting elements while in contact with such surface by the oscillations of the transmitter transmitted to such elements through said fluid in which they are suspended.

8. The method of treating the surface of an article, which method involves the use of a wave generator and a transmitter, and which includes the steps of: positioning the transmitter adjacent the surface to be treated; moving a stream of fluid between and in contact with such surface and the transmitter; suspending cutting elements in the stream; positioning the generator spaced from the transmitter and such surface; rapidly oscillating the transmitter by waves from the generator characterized by their travel between said generator and said transmitter at the speed of sound; and rapidly oscillating the cutting elements in directions substantially parallel to the path of such stream while in contact with such surface by the oscillations of the transmitter transmitted to such elements through said fluid in which they are suspended.

9. The method of treating the surface of an article having spaced projections thereon, which method involves the use of a wave generator and wave transmitter, and which method includes the steps of: positioning the transmitter adjacent such surface; positioning a body of fluid in contact with such surface and the transmitter; suspending in the fluid cutting elements of dimensions greater than the space between adjacent projections on such surface; positioning the generator at a greater distance from such surface from the transmitter; rapidly oscillating the transmitter by waves from the generator traveling between said generator and said transmitter at the speed of sound; and rapidly oscillating such cutting elements in contact with such surface by the oscillations of contacting particles of the fluid induced by the oscillations of the transmitter.

10. The method of treating the surface of an article, which method involves the use of a wave generator and transmitter, and which includes the steps of: positioning the transmitter adjacent the surface to be treated; positioning a body of liquid in contact with the transmitter and such surface; suspending cutting elements in the liquid; positioning the generator more distant from such surface than the transmitter; rapidly vibrating the transmitter in response to waves from the generator characterized by their travel between said generator and said transmitter at the speed of sound; and rapidly oscillating such elements substantially parallel to such surface while in contact with such surface by the oscillations of contacting particles of the liquid induced by the vibrations of the transmitter.

11. The method of treating the surface of an article, which method involves the use of a wave generator and transmitter, and which includes the steps of: positioning the transmitter adjacent the surface to be treated; positioning a body of liquid in contact with such surface and the transmitter; suspending cutting elements in the liquid; positioning the generator more distant from such surface than the transmitter; inducing rapid relative vibratory motion of such surface and the transmitter by waves from the generator characterized by their travel between said generator and said transmitter at the speed of sound; and rapidly oscillating the cutting elements while in contact with such surface by such vibratory motion transmitted to such elements through the liquid in which they are suspended.

12. The method of treating the surface of an article, which method involves the use of a wave transmitter and a wave generator, and which includes the steps of: positioning the transmitter adjacent the surface to be treated; positioning a body of fluid in contact with such surface and the transmitter; suspending surface treating elements in said fluid between such surface and the transmitter; positioning the wave generator spaced from the transmitter and such surface; oscillating the transmitter by waves from said generator characterized by their travel between said generator and said transmitter at the speed of sound; and rapidly oscillating such elements while in contact with such surface by the oscillations of the transmitter transmitted to such elements through the fluid in which they are suspended.

13. The method of treating the surface of an article, which method involves the use of a wave generator and transmitter, and which includes the steps of: positioning the transmitter adjacent the surface to be treated; positioning a body of liquid in contact with such surface and the transmitter; suspending cutting elements in the liquid; positioning the generator more distant from such surface than the transmitter; inducing rapid relative vibratory motion of such surface and the transmitter by waves from the generator characterized by their travel between said generator and said transmitter at the speed of sound; rapidly oscillating the cutting elements while in contact with such surface by such vibratory motion; and amplifying the oscillatory movement of the elements by waves in the liquid characterized by their travel in the liquid at the speed of sound.

14. The method of treating the surface of an article, which method involves the use of a wave generator and transmitter, and which includes the steps of: positioning the transmitter adjacent the surface to be treated; positioning a body of liquid in contact with such surface and the transmitter; suspending cutting elements in the liquid; positioning the generator more distant from such surface than the transmitter; inducing rapid relative vibratory motion of such surface and the transmitter by waves from the generator characterized by their travel between said generator and said transmitter at the speed of sound under conditions of resonance; rapidly oscillating the cutting elements while in contact with such surface by such vibratory motion; and amplifying the oscillatory movement of the elements by waves in the liquid characterized by their travel in the liquid at the speed of sound under conditions of resonance.

15. In an apparatus for treating the surface of an article, the combination of: a transmitter; means supporting said transmitter adjacent the surface to be treated; a fluid contacting said transmitter and such surface; surface treating elements in said fluid supported by said fluid; wave generating means; and means adapted for transmitting waves of alternate compression and tension impulses therein from said generating means to said transmitter to oscillate said elements in contact with such surface by oscillating particles of said fluid in which they are suspended.

16. In an apparatus for treating the surface of an article, the combination of: a vibration generator; a wave transmitter; means so supporting said transmitter adjacent the surface to be treated that said transmitter may reciprocate relative to such surface; a liquid contacting said transmitter and such surface; surface treating elements in said liquid supported only by said liquid; and a body of liquid connecting said vibration generator and said transmitter, the space between said generator and said transmitter being so related to the frequency of the vibrations generated by said generator that such vibrations induce the travel of waves of condensation and rarefaction of the liquid between said generator and said transmitter under conditions of resonance to oscillate rapidly said elements in contact with such surface by oscillations of contacting particles of the liquid induced by vibrations of said transmitter.

17. In an apparatus for removing material from a solid body: a tool comprising a rod-shaped element having a free end; means for setting the element into sustained longitudinal vibration causing said end to oscillate at high frequency and minute amplitude; a separate operative tool portion; means for interposing a liquid between said oscillating end and said separate tool portion for transmitting the oscillations to said tool portion; a fluid body interposed between said tool portion and said solid body; and surface treating elements in and supported by said fluid body for oscillation in contact with said solid body under influence of oscillations received and transmitted by said tool portion.

18. In an apparatus for removing material from a solid body; a tool comprising a rod-shaped element having a free end; means for setting the element into sustained longitudinal vibration causing said end to oscillate at high frequency and minute amplitude, a separate operative tool portion; means for interposing a vibratable liquid column between said oscillating end and said separate tool portion for transmitting the oscillations to said tool portion; means for interposing a fluid body between said tool portion and said solid body; a fluid body so interposed between said tool portion and solid body; and surface treating elements in and supported by said fluid body for oscillation in contact with said solid body through the agency of said oscillations transmitted to said tool portion and imparted thereby to said fluid body.

*19. The method of treating the surface of an article to remove material from the article and impart a predetermined contour to the treated region, and which involves the use of a wave generator and a transmitter including an elongated tool member, which comprises: imparting to an end portion of the tool member a contour corresponding in reverse to the contour desired, applying said tool to the surface to be treated, with said end portion adjacent to said surface, while holding said tool and surface against relative rotation, positioning a body of fluid in contact with such surface and the end portion of the tool member, suspending cutting elements in said fluid between said surface and the end portion of the tool member, oscillating said end portion of said elongated tool member by waves of compression and tension travelling from said generator longitudinally through said tool member characterized by their travel from said generator to and longitudinally through said tool member at the speed of transmission of longitudinal elastic vibrations in said tool member, thereby engendering at the area of contact a relative oscillation between tool and surface of high frequency and minute amplitude and having a component of movement perpendicular to said surface, and said relative oscillation rapidly oscillating said cutting elements while in contact with such surface by the oscillations of the tool member transmitted to such elements by the fluid, thereby maintaining a force of impact of said elements against said surface.*

*20. The method of treating the surface of a hard non-yielding solid body to remove material therefrom, and which involves the use of a wave generator and a rod member and transmitter, which comprises: positioning said transmitter adjacent the surface to be treated, positioning a body of fluid in contact with such surface and said transmitter, suspending particles of abrasive in said fluid between said surface and said transmitter, and oscillating said transmitter by compression impulses travelling in said rod member characterized by their travel from said generator to and longitudinally through said rod member at the speed of transmission of longitudinal elastic vibrations in said rod member, the oscillations of said transmitter being transmitted through the fluid so as to rapidly oscillate said particles of abrasive while in contact with said surface, thereby maintaining a force of impact of said particles against said surface.*

*21. The subject matter of claim 15, wherein said means for transmitting waves of alternate compression and tension impulses includes an elastic rod having a free oscillatory end, and said transmitter comprises an operative tool element driven from said free oscillatory end of said elastic rod.*

*22. The subject matter of claim 15, wherein said transmitter is positioned and oscillated by said transmitted waves so as to have a component of oscillatory motion towards and from said surface and acts to maintain an impacting force between said particles and said surface.*

*23. The subject matter of claim 15, wherein said transmitter is positioned and oscillated by said transmitted waves to have a component of oscillatory motion to and from said surface, and wherein said generator and transmitter are so constructed and arranged that when operated in their normal and intended manner, said transmitter will oscillate at minute amplitude at a frequency above 1000 cycles per second, said oscillating transmitter maintaining an impacting force between said particles and said surface acting in a direction substantially parallel with said transmitter oscillation.*

*24. A process for cutting material from a solid body, which comprises: setting up sustained compressional vibrations in a longitudinal direction in an elastic, free-ended vibration transmitting rod having operatively combined with its free end portion an operative tool element oscillated by the longitudinal vibration of the rod, establishing the frequency of said vibrations at a value higher than the quotient comprising the speed of sound divided by four times the length of the rod, whereby the rod is caused to alternately elastically elongate and contract at such frequency and within its elastic range, positioning said operative tool element adjacent the body to be cut, and positioning a fluid suspension of cutting elements in contact with said body and said operative tool element, whereby said cutting elements are rapidly oscillated while in contact with said body by the oscillations of said tool element transmitted to the suspended cutting elements by the fluid.*

ALBERT G. BODINE, JR.

References Cited in the file of this patent or the original patent

UNITED STATES PATENTS

| Number | Name | Date |
|---|---|---|
| Re. 22,122 | Warren et al. | June 16, 1942 |
| 26,363 | May | Dec. 6, 1859 |
| 209,173 | Kiswell et al. | Oct. 22, 1878 |
| 209,177 | Maloney et al. | Oct. 22, 1878 |
| 537,160 | King | Apr. 9, 1895 |
| 587,892 | Walter | Aug. 10, 1897 |
| 964,192 | Vanneman | July 12, 1910 |
| 1,334,282 | Constantinesco | Mar. 23, 1920 |
| 2,050,777 | Berger | Aug. 11, 1936 |
| 2,070,944 | Hillix | Feb. 16, 1937 |
| 2,175,237 | Young | Oct. 10, 1939 |
| 2,271,743 | Nagy | Feb. 3, 1942 |
| 2,280,446 | Nyman | Apr. 21, 1942 |
| 2,293,100 | Baumgold | Aug. 18, 1942 |
| 2,304,793 | Bodine | Dec. 15, 1942 |
| 2,324,292 | Dremel | July 13, 1943 |